(12) United States Patent
Ito

(10) Patent No.: US 11,933,177 B2
(45) Date of Patent: Mar. 19, 2024

(54) VENTILATION SYSTEM

(71) Applicant: TOYOTA JIDOSHA KABUSHIKI KAISHA, Toyota (JP)

(72) Inventor: Masayuki Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 17/335,165

(22) Filed: Jun. 1, 2021

(65) Prior Publication Data
US 2022/0034225 A1 Feb. 3, 2022

(30) Foreign Application Priority Data
Jul. 28, 2020 (JP) ................................. 2020-127480

(51) Int. Cl.
*E21F 1/16* (2006.01)
*E21F 1/04* (2006.01)
*F24F 6/18* (2006.01)
*F24F 7/02* (2006.01)

(52) U.S. Cl.
CPC ............... *E21F 1/16* (2013.01); *E21F 1/04* (2013.01); *F24F 6/18* (2013.01); *F24F 7/02* (2013.01)

(58) Field of Classification Search
CPC ...................................... F24F 6/18; F24F 7/02
USPC ......................................................... 454/250
See application file for complete search history.

(56) References Cited

U.S. PATENT DOCUMENTS

| 2007/0099049 A1* | 5/2007 | Knight | H01M 8/04164 429/465 |
| 2013/0137006 A1* | 5/2013 | Morita | H01M 8/04776 429/444 |
| 2015/0323199 A1* | 11/2015 | Lee | F28D 20/0039 122/15.1 |

FOREIGN PATENT DOCUMENTS

| JP | H0748005 A | 2/1995 |
| JP | 2007115459 A | 5/2007 |
| JP | 2008151482 A | 7/2008 |

OTHER PUBLICATIONS

Introduction of Toyota Connected City Project "WovenCity" by Designer Mr. Bjarke Ingels, https://www.axismag.jp/posts/2020/01/162586.html.

* cited by examiner

*Primary Examiner* — Avinash A Savani
*Assistant Examiner* — Dana K Tighe
(74) *Attorney, Agent, or Firm* — Dickinson Wright, PLLC

(57) ABSTRACT

A ventilation system including a building having a space inside, a subterranean facility arranged in a basement of the building and having a subterranean space inside, a communication passage establishing communication between the space and the subterranean space, and a ventilation hole establishing communication between an earth outside the building and the subterranean space is provided. A fuel cell unit having an exhaust port is arranged in the subterranean space. The communication passage has a lateral wall protruding downward from a ceiling of the subterranean space. The lateral wall is arranged on the exhaust port side when the communication passage is arranged on a straight line linking the exhaust port and a second opening portion of the ventilation hole on the subterranean space side. The lateral wall is arranged on the straight line side when the commu- (Continued)

nication passage is arranged at a position spaced apart from the straight line.

6 Claims, 3 Drawing Sheets

200

300

VENTILATION SYSTEM

CROSS-REFERENCE TO RELATED APPLICATION

This application claims priority to Japanese Patent Application No. 2020-127480 filed on Jul. 28, 2020, incorporated herein by reference in its entirety.

BACKGROUND

1. Technical Field

The present application relates to a ventilation system.

2. Description of Related Art

Arts for maintaining the infrastructures of buildings and enhancing safety and convenience have been disclosed. For example, Japanese Unexamined Patent Application Publication No. 2007-115459 (JP 2007-115459 A) discloses a privately-owned electric power generation system that is equipped with a fuel cell device outside a house. Japanese Unexamined Patent Application Publication No. 7-48005 (JP 7-48005 A) discloses a logistics system having communication passages each establishing communication between each of dwelling units and a subterranean space so that goods are conveyed between each of the dwelling units and the subterranean space. Japanese Unexamined Patent Application Publication No. 2008-151482 (JP 2008-151482 A) discloses a ventilation system that connects buildings under an atmospheric environment adversely affecting human beings and the like with a region in a good atmospheric environment via communication passages or the like to ventilate the buildings.

On the other hand, there have recently been proposed urban development plans with infrastructures constructed in basements of buildings so that inhabitants can move safely and comfortably on the earth. It has been proposed, for example, to generate electric power in a subterranean space through the use of a fuel cell and supply the generated electric power to each of dwelling units. Besides, it has been proposed to cause vehicles for delivering packages to run in the subterranean space and convey goods between the subterranean space and the dwelling units via communication passages respectively.

SUMMARY

In the case where electric power is generated through the use of a fuel cell unit in the subterranean space while making use of the subterranean space for the transfer of the vehicles for delivering packages or the like, the hydrogen contained in the exhaust gas in the fuel cell unit needs to be appropriately discharged from the subterranean space. In this case, it is necessary to ensure that the hydrogen does not enter the buildings from the subterranean space through the communication passages.

In the art described in JP 2007-115459 A, fuel cells are arranged on the earth and outside, so the hydrogen in exhaust gas is diluted by the atmosphere and is unlikely to enter the buildings. However, only hydrogen tanks are installed in the basements, so the subterranean space is not effectively utilized. The art described in JP 7-48005 A is not premised on the arrangement of the fuel cells in the subterranean space. In the art described in JP 2008-151482 A, when the fuel cells are arranged in the subterranean space, the hydrogen in exhaust gas may enter the buildings via the communication passages.

The disclosure provides a ventilation system capable of restraining the hydrogen discharged from a fuel cell unit arranged in a subterranean space from entering a communication passage and appropriately discharging this hydrogen from the subterranean space to the earth.

An aspect of the disclosure discloses a ventilation system including a building that has a space inside, a subterranean facility that is arranged in a basement of the building and that has a subterranean space inside, a communication passage configured to establish communication between the space of the building and the subterranean space, and a ventilation hole configured to establish communication between an earth outside the building and the subterranean space. A fuel cell unit having an exhaust port is arranged in the subterranean space. A first opening portion that is an opening portion of the communication passage on a side of the subterranean space is arranged apart from the exhaust port of the fuel cell unit in a horizontal direction. The communication passage has a lateral wall that covers at least a part of a periphery of the communication passage and that protrudes downward from a ceiling of the subterranean space. The lateral wall is arranged on a side of the exhaust port when the communication passage is arranged on a straight line linking the exhaust port of the fuel cell unit and a second opening portion that is an opening portion of the ventilation hole on the side of the subterranean space. The lateral wall is arranged on a side of the straight line when the communication passage is arranged at a position spaced apart from the straight line.

In the foregoing aspect of the ventilation system, the lateral wall may be formed in such a manner as to surround the periphery of the communication passage along an entire circumference from the ceiling of the subterranean space to the first opening portion. Besides, the first opening portion may be arranged below the second opening portion.

The foregoing aspect of the ventilation system may include a plurality of buildings, a plurality of subterranean facilities arranged in basements of the buildings respectively, and a plurality of communication passages each being configured to establish communication between the space of a corresponding one of the buildings and the subterranean space of a corresponding one of the subterranean facilities. The communication passages may have lateral walls arranged apart from one another in the horizontal direction.

In the foregoing aspect of the ventilation system, the ventilation hole may be equipped with a roof that covers from above an opening portion of the ventilation hole on a side of the earth. Besides, the communication passage may be internally equipped with an elevator. Furthermore, the lateral wall may have an eave that protrudes from the lateral wall toward an outside of the communication passage. Besides, the eave may be arranged above the first opening portion. The eave may be arranged on the lateral wall on the side of the exhaust port when the communication passage is arranged on the straight line. The eave may be arranged on the lateral wall on the side of the straight line when the communication passage is arranged at a position spaced apart from the straight line.

The ventilation system of the present disclosure can restrain the hydrogen discharged from the fuel cell unit from entering the communication passage and appropriately discharge this hydrogen from the subterranean space to the earth.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
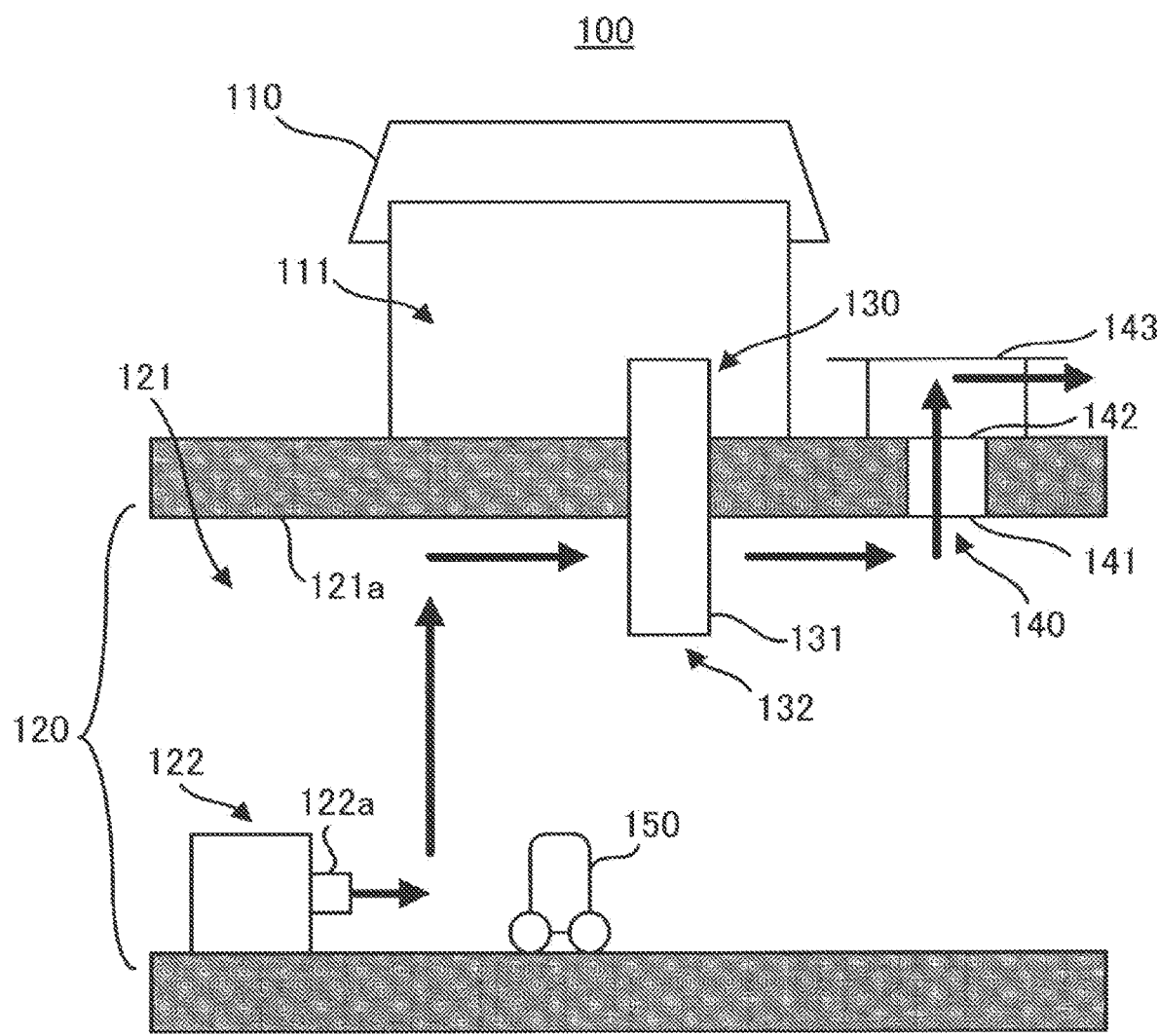
FIG. 1 is a schematic view of a ventilation system 100 of the first embodiment.

A ventilation system of the present disclosure includes a building having a space inside, a subterranean facility that is arranged in a basement of the building and that has a subterranean space inside, a communication passage that establishes communication between the space and the subterranean space, and a ventilation hole that establishes communication between an earth outside the building and the subterranean space. A fuel cell unit having an exhaust port is arranged in the subterranean space. A first opening portion that is an opening portion of the communication passage on the subterranean space side is arranged apart from the exhaust port of the fuel cell unit in a horizontal direction. The communication passage has a lateral wall that covers at least a part of a periphery of the communication passage and that protrudes downward from a ceiling of the subterranean space. The lateral wall is arranged on the exhaust port side when the communication passage is arranged on a straight line linking the exhaust port of the fuel cell unit and a second opening portion that is an opening portion of the ventilation hole on the subterranean space side. The lateral wall is arranged on the straight line side when the communication passage is arranged at a position spaced apart from the straight line.

The fuel cell unit generates electric power through an electrochemical reaction of hydrogen as fuel gas and the oxygen in air, and discharges water. In addition to water, however, the fuel cell unit discharges the hydrogen and air unused in the reaction. Hydrogen is lighter than air, so the discharged hydrogen may accumulate in the vicinity of the ceiling of the subterranean space. In order to restrain hydrogen from accumulating in the vicinity of the ceiling in this manner, it is conceivable to arrange the ventilation hole that establishes communication between the subterranean space and the earth, and discharge the accumulated hydrogen to the earth. However, in the case where the communication passage leading to the interior of the building is arranged between the fuel cell unit and the ventilation hole, hydrogen may enter the building via the communication passage. Besides, even in the case where the communication passage leading to the interior of the building is not arranged between the fuel cell unit and the ventilation hole, hydrogen may enter the building via the communication passage when the communication passage is arranged at a position close to the straight line linking the exhaust port of the fuel cell unit and the ventilation hole.

The ventilation system of the present disclosure includes the communication passage having the predetermined lateral wall. Thus, when moving to the ventilation hole along the ceiling, the diffused hydrogen is introduced to the ventilation hole after bypassing the periphery of the lateral wall. Therefore, the entrance of the hydrogen discharged from the first opening portion that is the opening portion of the communication passage on the subterranean space side can be restrained. Besides, the first opening portion is arranged apart from the exhaust port of the fuel cell unit in the horizontal direction. Thus, even in the case where the exhaust port of the fuel cell unit is arranged below the first opening portion, the hydrogen discharged from the exhaust port can be restrained from directly entering the communication passage. In consequence, the ventilation system of the present disclosure can restrain the hydrogen discharged from the fuel cell unit from entering the communication passage, and appropriately discharge this hydrogen from the subterranean space to the earth.

Besides, since the entrance of hydrogen into the communication passage can be restrained in this manner, the number of ventilation holes to be set can be reduced as well. Furthermore, the ventilation system of the present disclosure enables effective utilization of the subterranean space. For example, electric power can be supplied to the building by fuel cells in the subterranean space, and packages can be delivered to the space inside the building from the subterranean space via the running of delivery vehicles and the communication passage. As described hitherto, the ventilation system of the present disclosure can contribute towards realizing an urban development plan with enhanced safety and convenience.

The ventilation system of the present disclosure will be further described hereinafter through the use of the respective embodiments. It should be noted, however, that the ventilation system of the present disclosure is not limited to these embodiments.

First Embodiment

A ventilation system 100 of the first embodiment will be described. FIG. 1 is a schematic view of the ventilation system 100.

As shown in FIG. 1, the ventilation system 100 includes a building 110 having a space 111 inside, a subterranean facility 120 that is arranged in a basement of the building 110 and that has a subterranean space 121 inside, a communication passage 130 that establishes communication between the space 111 and the subterranean space 121, and a ventilation hole 140 that establishes communication between an earth outside the building 110 and the subterranean space 121.

The purpose of use of the building 110 is not limited in particular. The building 110 may be a residence or an office. The building 110 has the space 111 inside. The space 111 is preferably a residential space that can be inhabited by human beings. Incidentally, in the case where the building 110 has a basement, the subterranean facility 120 may be provided further below the basement.

The subterranean facility 120 has the subterranean space 121 inside. The purpose of use of the subterranean space 121 is not limited in particular, but the subterranean space 121 is preferably formed such that a vehicle 150 for conveying packages can run therein as shown in FIG. 1. Besides, a fuel cell unit 122 having an exhaust port 122a is arranged in the subterranean space 121 of the subterranean facility 120.

The fuel cell unit 122 is not limited in particular as long as electric power is obtained through an electrochemical reaction of hydrogen and the oxygen in air. A known fuel cell unit can be used as the fuel cell unit 122. Besides, the fuel cell unit 122 discharges the water produced through the electrochemical reaction and unreacted hydrogen and air from the exhaust port 122a.

The communication passage 130 is a passage that establishes communication between the space 111 of the building 110 and the subterranean space 121, and serves to ensure that goods are conveyed and people are transferred between the space 111 and the subterranean space 121. The communication passage 130 has a lateral wall 131 that covers at least a part of a periphery of the communication passage 130 and that protrudes downward (toward the subterranean space 121 side) from a ceiling 121a of the subterranean space 121. Besides, the communication passage 130 has, on the subterranean space 121 side, a first opening portion 132 that communicates with the interior of the communication passage 130.

The lateral wall 131 may be arranged on the exhaust port 122a side when the communication passage 130 is arranged on a straight line that links the exhaust port 122a of the fuel cell unit 122 and a second opening portion 141 that is an opening portion of the ventilation hole 140 on the subterranean space side, and may be arranged on the straight line side when the communication passage 130 is arranged at a position spaced apart from the straight line. The expression "on the straight line" also includes cases where the communication passage 130 is arranged above the straight line. Thus, when being ventilated to the earth through the ventilation hole 140, the hydrogen in the vicinity of the ceiling 121a is introduced to the ventilation hole 140 after bypassing the periphery of the lateral wall 131 of the communication passage 130. Therefore, hydrogen can be restrained from entering the first opening portion 132. As shown in FIG. 1, the lateral wall 131 may be formed in such a manner as to surround the periphery of the communication passage 130, along the entire circumference thereof, from the ceiling 121a of the subterranean space 121 to the first opening portion 132. Thus, hydrogen can be further restrained from entering the communication passage 130. From the standpoint of further restraining hydrogen from entering the communication passage 130, the range where the entire circumference of the communication passage 130 of the lateral wall 131 is surrounded (the length from the ceiling 121a to the first opening portion 132) is preferably equal to or longer than 10 centimeters. The upper limit of the range where the entire circumference of the communication passage 130 is surrounded is not limited in particular, but may be appropriately set in accordance with the purpose.

The position of the first opening portion 132 of the communication passage 130 on the subterranean space 121 side is not limited in particular. It is sufficient for the first opening portion 132 to be formed in such a manner as to communicate with the interior of the communication passage 130. In FIG. 1, the first opening portion 132 having an opening below is formed by the lateral wall 131.

A case where the ventilation system 100 includes a plurality of buildings 110, subterranean facilities 120 arranged in basements of the buildings 110 respectively, and a plurality of communication passages 130 that establish communication between spaces 111 of the buildings 110 and subterranean spaces 121 of the subterranean facilities 120 respectively will be considered. For example, a case where the buildings 110 are installed in the depth direction of the sheet of FIG. 1 and provided with the communication passages 130 respectively will be considered. In this case, lateral walls 131 of the communication passages 130 are preferably arranged apart from one another in a horizontal direction, instead of being continuous to one another. Thus, the discharged hydrogen can flow through spaces among the lateral walls 131 spaced apart from one another, and this hydrogen can be restrained from accumulating and entering the communication passages 130.

Incidentally, the communication passage 130 is provided to ensure that goods are conveyed therethrough and people are transferred therethrough. Therefore, an elevator, stairs, or the like for conveying goods or transferring people may be installed inside the communication passage 130. The communication passage 130 below the lateral wall 131 is not depicted in FIG. 1, but such transfer means are installed. Besides, the type of the communication passage 130 on the space 111 side of the building 110 is not limited in particular, but can be appropriately set in accordance with the purpose. For example, an opening portion (a third opening portion) may be provided through the communication passage 130 on the space 111 side, and goods and the like may be conveyed via the third opening portion. Furthermore, the communication passage 130 is a passage that establishes communication between the space 111 of the building 110 and the subterranean space 121, but the single communication passage 130 does not prevent a plurality of spaces 111 in the building 110 from being connected to the subterranean space 121. For example, in the case where the building 110 has a plurality of floors, the communication passage 130 can link the spaces 111 with the subterranean space 121 by communicating through the floors in a vertical direction.

The ventilation hole 140 establishes communication between the earth outside the space 111 of the building 110 and the subterranean space 121, and can discharge the hydrogen discharged from the fuel cell unit 122 from the subterranean space 121 to the earth. Therefore, by providing the ventilation hole 140, the hydrogen accumulating in the vicinity of the ceiling 121a can be appropriately discharged to the earth. Incidentally, from the standpoint of preventing the hydrogen discharged from the subterranean space 121 from entering the space 111 of the building 110, the ventilation hole 140 communicates with the earth outside the building 110.

As shown in FIG. 1, from the standpoint of restraining the entrance of rainwater, the ventilation hole 140 may be equipped with a roof 143 that covers, from above, an opening portion (a fourth opening portion) 142 on the earth side as shown in FIG. 1. Besides, the ventilation hole 140 may be provided with a fan therein to promote ventilation. Furthermore, the fourth opening portion 142 of the ventilation hole 140 on the earth side and the second opening portion 141 on the subterranean space 121 side may be formed like slits to restrain the entrance of foreign matters.

A positional relationship among the respective components will now be described. The first opening portion 132 of the communication passage 130 is arranged apart from the exhaust port 122a of the fuel cell unit 122 in the horizontal direction. Hydrogen is lighter than air, and hence moves toward the ceiling 121a after being discharged from the exhaust port 122a. Therefore, the first opening portion 132 of the communication passage 130 needs to be arranged apart from the exhaust port 122a in the horizontal direction instead of being arranged above the exhaust port 122a so as to prevent hydrogen from directly entering the communication passage 130. Besides, it is also possible for the hydrogen discharged from the exhaust port 122a to rise while moving in the horizontal direction due to the flow of air in the subterranean space 121. Therefore, the exhaust port 122a and the first opening portion 132 are preferably spaced apart from each other in the horizontal direction by one meter or more. Thus, the hydrogen discharged from the exhaust port 122a can be further restrained from directly entering the communication passage 130.

The first opening portion 132 of the communication passage 130 may be arranged below the second opening portion 141 of the ventilation hole 140. Thus, hydrogen can be appropriately discharged from the subterranean space 121 to the earth via the ventilation hole 140 while restraining the hydrogen flowing in the vicinity of the ceiling 121a from entering the communication passage 130. From the standpoint of promoting ventilation, the second opening portion 141 of the ventilation hole 140 may be provided through the ceiling 121a as shown in FIG. 1.

Second Embodiment

Figure 2:
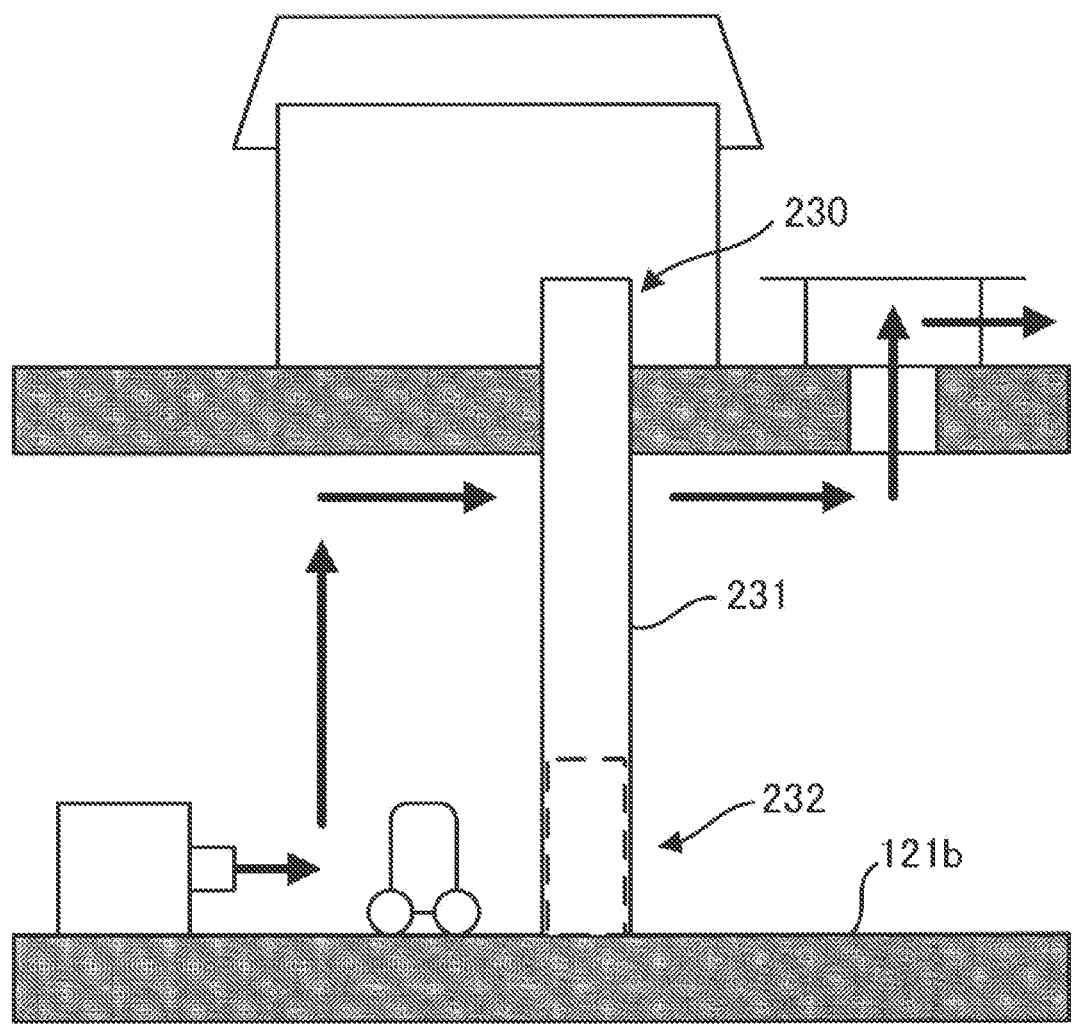
FIG. 2 is a schematic view of a ventilation system 200 of the second embodiment.

A ventilation system 200 of the second embodiment will be described. FIG. 2 is a schematic view showing the ventilation system 200. The ventilation system 200 is different from the ventilation system 100 in that an elevator for conveying goods is installed inside a communication passage 230, and is identical to the ventilation system 100 in the other configurational details. Accordingly, the following description will be given focusing only on the communication passage 230.

The communication passage 230 has a lateral wall 231 that extends from the ceiling 121a to a ground 121b of the subterranean space 121. The elevator capable of vertically moving a cage for conveying goods is installed inside the communication passage 230.

Besides, the lateral wall 231 of the communication passage 230 on the ground 121b side is partially notched, and the communication passage 230 has a first opening portion 232 (a region indicated by broken lines in FIG. 2) having an opening through a vertical surface formed by the lateral wall 231 and the ground 121b. The first opening portion 232 is equipped with an openable/closable door (not shown). Besides, a region of the lateral wall 231 above the first opening portion 232 (a range from the ceiling 121a to the first opening portion 232) is formed in such a manner as to surround the periphery of the communication passage 230 along the entire circumference thereof. A positional relationship representing how the first opening portion 232 is positionally related to the exhaust port 122a of the fuel cell unit 122 and the second opening portion 141 of the ventilation hole 140 is the same as in the ventilation system 100. In consequence, the ventilation system 200 can restrain hydrogen from entering the communication passage, as is the case with the ventilation system 100.

With the ventilation system 200, for example, goods transported by the vehicle 150 moving in the subterranean space 121 can be conveyed into the space 111 in the building 110 by being put into the cage of the elevator from the first opening portion 232 of the communication passage 230 on the subterranean space 121 side. Besides, on the contrary, the goods can be conveyed out to the subterranean space 121 by being put into the cage of the elevator from the space 111 of the building 110.

Third Embodiment

Figure 3:
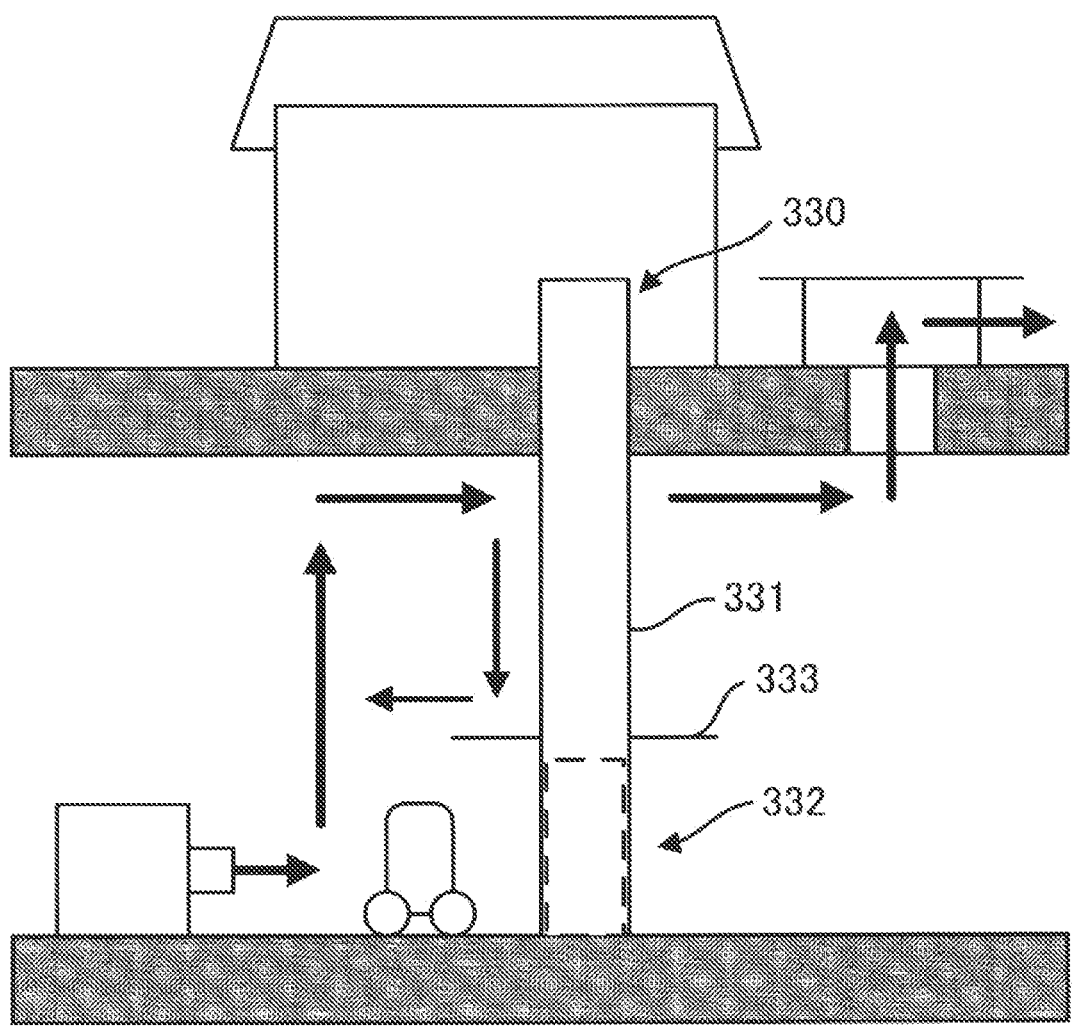
FIG. 3 is a schematic view of a ventilation system 300 of the third embodiment.

A ventilation system 300 of the third embodiment will be described. FIG. 3 is a schematic view showing the ventilation system 300. The ventilation system 300 is different from the ventilation system 200 in that a communication passage 330 is provided with an eave 333, and is identical to the ventilation system 200 in the other configurational details. Accordingly, the following description will be given focusing only on the communication passage 330.

The communication passage 330 has a lateral wall 331 having the eave 333 that protrudes toward the outside of the communication passage 330 from the lateral wall 331. Besides, the eave 333 is arranged above a first opening portion 332 of the communication passage 330 on the subterranean space 121 side. Also, the eave 333 is arranged on the lateral wall 331 on the exhaust port 122a side when the communication passage 330 is arranged on a straight line linking the exhaust port 122a of the fuel cell unit 122 and the second opening portion 141 of the ventilation hole 140 with each other, and is arranged on the lateral wall 331 on the straight line side when the communication passage 330 is arranged at a position spaced apart from the straight line.

In the case where the amount of discharged hydrogen is large, part of the hydrogen diffused from the ceiling 121a may enter the communication passage 330 in such a manner as to turn around along the lateral wall 331. Thus, the eave 333 is provided at a predetermined position above the first opening portion 332 in the vertical direction to prevent hydrogen from entering the communication passage 330. As a result, hydrogen can be further restrained from entering the communication passage 330.

It should be noted herein that the eave 333 may be arranged along the entire circumference of the periphery of the lateral wall 331 as shown in FIG. 3. Thus, hydrogen can be still further restrained from entering the communication passage 330.

The length by which the eave 333 protrudes outward is not limited in particular, but is preferably equal to or longer than two centimeters. Thus, hydrogen can be further restrained from entering the communication passage 330. The upper limit of this length is not limited in particular, but is preferably equal to or shorter than 10 centimeters. Besides, the distance between the eave 333 and the first opening portion 332 in the vertical direction is not limited in particular, but the eave 333 is preferably located at a long distance from the ceiling 121a of the subterranean space 121 and immediately above the first opening portion 332. The distance from the first opening portion 332 to the eave 333 in the vertical direction is, for example, equal to or shorter than five centimeters. Thus, a wide area can be ensured above the eave. Therefore, hydrogen can be further restrained from entering the communication passage 330.

The ventilation system of the present disclosure has been described above. The ventilation system of the present disclosure solves the problems that can arise in urban development plans with fuel cells installed in subterranean facilities, and is considered to be an extremely useful technology.

What is claimed is:

1. A ventilation system comprising:
    a building that has a space inside;
    a subterranean facility that is arranged in a basement of the building and that has a subterranean space inside;
    a communication passage configured to establish communication between the space of the building and the subterranean space; and
    a ventilation hole configured to establish communication between an earth outside the building and the subterranean space, wherein
    a fuel cell unit having an exhaust port is arranged in the subterranean space,
    the communication passage has:
        a first opening portion that is formed on a side of the subterranean space and arranged apart from the exhaust port of the fuel cell unit in a horizontal direction; and a lateral wall that covers at least a part of a periphery of the communication passage and that protrudes downward from a ceiling of the subterranean space, and the first opening portion is arranged below a second opening portion that is an opening portion of the ventilation hole on the side of the subterranean space.

2. The ventilation system according to claim 1, wherein the lateral wall is formed in such a manner as to surround the periphery of the communication passage along an entire circumference from the ceiling of the subterranean space to the first opening portion.

3. The ventilation system according to claim 1, comprising:
   a plurality of buildings identical to the building;
   a plurality of subterranean facilities identical to the subterranean facility and arranged in basements of the buildings respectively; and
   a plurality of communication passages identical to the communication passage, each of the communication passages being configured to establish communication between the space of a corresponding one of the buildings and the subterranean space of a corresponding one of the subterranean facilities, wherein
   the communication passages have lateral walls identical to the lateral wall and arranged apart from one another in the horizontal direction.

4. The ventilation system according to claim 1, wherein the ventilation hole is equipped with a roof that covers from above an opening portion of the ventilation hole on a side of the earth.

5. The ventilation system according to claim 1, wherein the communication passage is internally equipped with an elevator.

6. The ventilation system according to claim 1, wherein the lateral wall has an eave that protrudes from the lateral wall toward an outside of the communication passage, the eave is arranged above the first opening portion.

* * * * *